April 30, 1929.  E. A. KREBS ET AL  1,711,355

SUBSOIL PLOW

Filed May 7, 1928

Inventors:
Franz Alfred Krebs
Ewald Arthur Krebs

Patented Apr. 30, 1929.

1,711,355

UNITED STATES PATENT OFFICE.

EWALD ARTHUR KREBS AND FRANZ ALFRED KREBS, OF OBERELSDORF, GERMANY.

SUBSOIL PLOW.

Application filed May 7, 1928, Serial No. 275,827, and in Germany March 21, 1923.

This invention relates to a subsoil plow and consists in arranging a subsoil share at each end of a vertical longitudinally adjustable bar which is mounted in guides behind the main plow share and controlled by a pivotally supported hand lever whereby it can be raised and lowered, means being provided for securing the hand lever and subsoil share in adjusted position.

The small subsoil share will add but little to the resistance of the plow, while the loosening of the subsoil obtained by the use of the share, will have a very beneficial influence on the plant growth.

Figure 1:
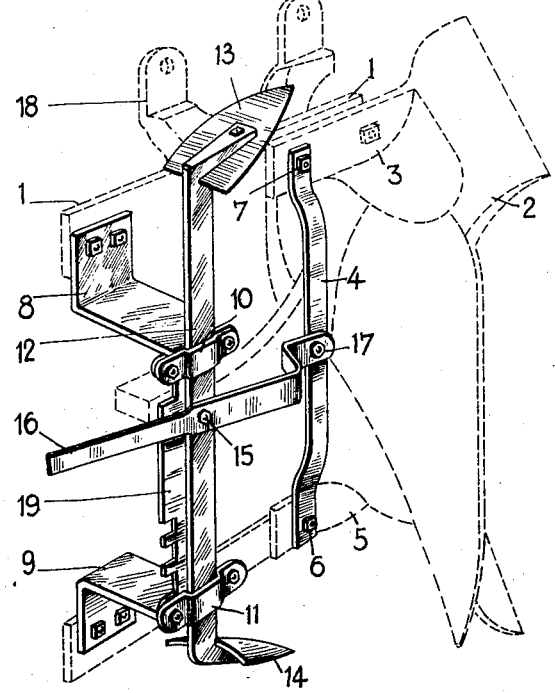
Figure 2:
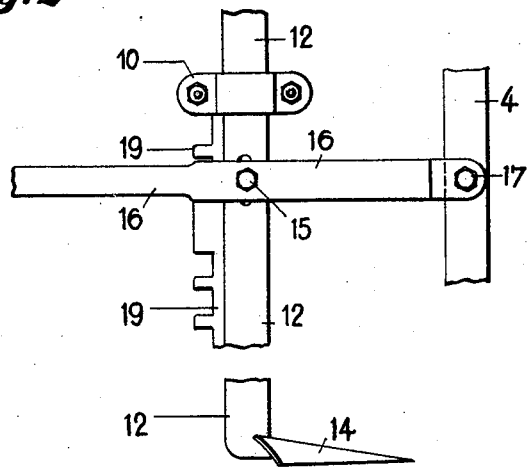

Fig. 1 of the accompanying drawings represents a perspective view of the entire arrangement, and Fig. 2 is a view of the operating mechanism.

The plow frame has parallel members 1 and 5 to which, behind the main plow share 2, brackets 8 and 9 are connected. Saddle pieces 10 and 11 on said brackets serve as guides for a vertical bar 12 to the ends of which subsoil shares 13 and 14 are connected. The bar 12 is controlled by a hand lever 16 which is pivoted at 15 to the bar and at 17 to a bridge piece 4, the latter being secured by screws 7, at one end to the frame member 5 and at the other end to a frame member 3. The hand lever can be operated for raising and lowering the subsoil share in adjusted position.

The traction elements are connected to brackets 18 on the plow.

We claim:

1. In a plow, a vertical, longitudinally adjustable bar arranged behind the main plow share, a subsoil share connected to each end of said bar, a pivotally supported hand lever connected to said bar for the adjustment thereof, and means for securing said hand lever together with the bar in different positions.

2. In a plow, a vertical, longitudinally adjustable bar arranged behind the main plow share, a subsoil share connected to each end of said bar, a pivotally supported hand lever connected to said bar for the adjustment thereof, a rigidly supported rack arranged parallel to said bar, and means enabling the hand lever to engage said rack for securing the bar in different elevations.

EWALD ARTHUR KREBS.
FRANZ ALFRED KREBS.